United States Patent
Liang et al.

(10) Patent No.: US 11,182,026 B2
(45) Date of Patent: Nov. 23, 2021

(54) TEMPERATURE AND ULTRASONIC SENSOR FUSION FOR BIOMETRIC SENSING

(71) Applicant: QUALCOMM Incorporated, San Diego, CA (US)

(72) Inventors: Yue Liang, San Jose, CA (US); Yipeng Lu, Davis, CA (US); Hrishikesh Vijaykumar Panchawagh, Cupertino, CA (US); Jessica Liu Strohmann, Cupertino, CA (US); Changting Xu, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/854,495

(22) Filed: Apr. 21, 2020

(65) Prior Publication Data
US 2021/0325996 A1    Oct. 21, 2021

(51) Int. Cl.
*G06F 3/041* (2006.01)
*G06F 3/043* (2006.01)
*H01L 27/32* (2006.01)
*G01K 7/01* (2006.01)
*G01K 1/14* (2021.01)
*G06F 21/32* (2013.01)
*G06K 9/00* (2006.01)

(52) U.S. Cl.
CPC .............. *G06F 3/0436* (2013.01); *G01K 1/14* (2013.01); *G01K 7/015* (2013.01); *G06F 3/0412* (2013.01); *G06F 21/32* (2013.01); *G06K 9/0002* (2013.01); *H01L 27/323* (2013.01)

(58) Field of Classification Search
CPC ...... G06F 3/0436; G06F 3/0412; G06F 21/32; G01K 1/14; G01K 7/015; G06K 9/0002; H01L 27/323
See application file for complete search history.

(56) References Cited

U.S. PATENT DOCUMENTS

| | | | |
|---|---|---|---|
| 2012/0274598 A1* | 11/2012 | Uy | G06K 9/685 345/174 |
| 2012/0280127 A1* | 11/2012 | Rosalik, Jr. | G01D 5/3473 250/338.1 |
| 2014/0354597 A1 | 12/2014 | Kitchens, II et al. | |
| 2016/0246396 A1 | 8/2016 | Dickinson et al. | |
| 2017/0328866 A1 | 11/2017 | Apte et al. | |
| 2018/0101711 A1* | 4/2018 | D'Souza | G06K 9/228 |
| 2020/0034522 A1 | 1/2020 | Kompala et al. | |
| 2020/0074134 A1* | 3/2020 | Lim | G06K 9/03 |

OTHER PUBLICATIONS

International Search Report and Written Opinion—PCT/US2021/027840—ISA/EPO—dated Aug. 3, 2021.

* cited by examiner

*Primary Examiner* — Towfiq Elahi
(74) *Attorney, Agent, or Firm* — Qualcomm Incorporated (57) ABSTRACT

An example method of operation may include detecting a user touch in a first area based upon sensor data from one or more sensors of a first type, waking up one or more sensors of a second type configured to measure across some or all of the first area in response to the detecting, obtaining additional sensor data from the one or more sensors of the second type, and determining a location associated with the user touch based in part upon the sensor data from the one or more sensors of the second type.

18 Claims, 7 Drawing Sheets

TEMPERATURE AND ULTRASONIC SENSOR FUSION FOR BIOMETRIC SENSING

INTRODUCTION

Aspects of this disclosure relate generally to biometric sensors, and more particularly to temperature sensors combined with ultrasonic sensors.

The increasing demand of under display fingerprint sensors require accurate temperature prediction to ensure proper background calibration and a higher fingerprint acceptance rate. For example, existing 20 mm (millimeter) by 30 mm sensors may utilize four temperature diodes to monitor temperature change across the sensor, such as by having one diode in each corner of a sensor area. Such an approach may fail to accurately predict temperature change across a sensor profiles due to the large size of a sensor. For example, when a user finger is not touching near the corner of the sensor, the temperature sensing diodes may not function properly. Failure to predict temperature accurately may lead to poor sensor background calibration.

Biometric scan detection and similar technologies may require a certain level of accuracy to ensure user satisfaction. For example, smartphones, tablets, computer displays, security interfaces, etc., and other devices may utilize optimal biometric finger scanning to properly authenticate a person. However, new and increasingly accurate approaches are necessary to provide accurate and/or fine precision to biometric detection configurations.

SUMMARY

The following summary is an overview provided solely to aid in the description of various aspects of the disclosure and is provided solely for illustration of the aspects and not limitations thereof.

In one example, a device is disclosed. The device may include, for example, a fingerprint sensor including an ultrasonic sensor, and a plurality of temperature sensors, at least a portion of which detect a temperature change from a user touch on a first area of the ultrasonic sensor, determine a first area location with respect to an area of the ultrasonic sensor, and perform an ultrasound scan of the first area location without a scan of the entire area of the ultrasonic sensor to identify a fingerprint associated with the user touch.

In another example, a method is disclosed. The method may include, for example, detecting a temperature change, detecting user touch on a first area of a sensor from the detected temperature change, determining a first area location with respect to an area of the sensor, and performing an ultrasound scan of the first area location without scanning the entire area of the sensor to identify a fingerprint associated with the user touch.

BRIEF DESCRIPTION OF THE DRAWINGS

The accompanying drawings are presented to aid in the description of various aspects of the disclosure and are provided solely for illustration of the aspects and not limitations thereof.

DETAILED DESCRIPTION

The present disclosure relates generally to ultrasonic sensors and temperatures sensors and related methods. According to certain aspects, an ultrasonic sensor may include a surface having a plurality of piezoelectric transducers (PTs). The piezoelectric transducers may include, for example, piezoelectric micromachined ultrasonic transducers. One or more of the piezoelectric transducers may be configured to receive a piezoelectric transducer control signal and generate an ultrasonic transmission wave at a specific location identified by a temperature sensor. When a temperature increase is identified from a user's touch (i.e., finger near or resting on the sensor surface), the area where the temperature change is detected may be scanned by an ultrasonic (piezoelectric) sensor at a relatively low power across a relatively small area to conserve energy while providing accurate location detection of the user touch.

Figure 1:
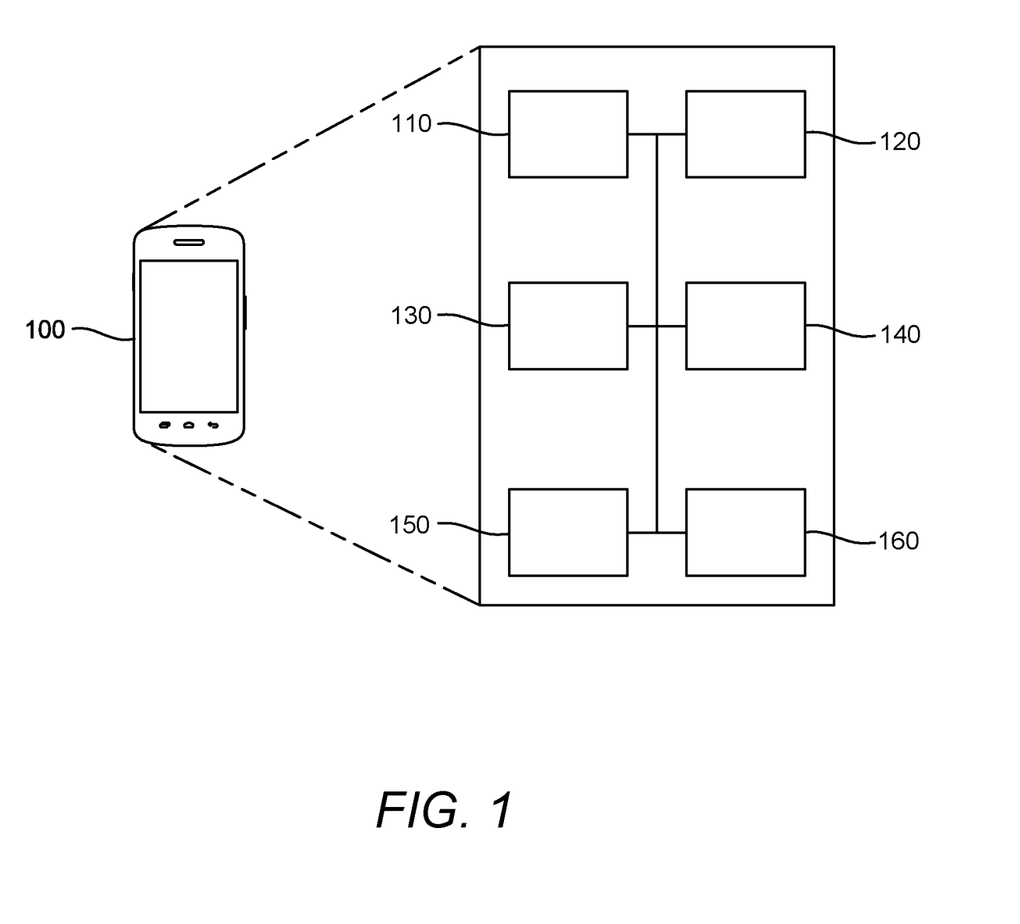
FIG. 1 illustrates a device having temperature sensing and ultrasonic detection capabilities.

FIG. 1 illustrates a device 100 that includes temperature sensing and ultrasonic user touch location determination capabilities. Although the device 100 is depicted as a smartphone, it will be understood that many types of devices have temperature sensing and ultrasonic user touch location determination capabilities (e.g., other computing devices, robots, automobiles, drones, etc.)5

The device 100 includes a processor 110, a memory 120, a power unit 130, a user interface 140, a transceiver 150, and temperature sensing and ultrasonic scanning control unit 160. The processor 110 executes instructions stored on the memory 120. The memory 120 may store other data that is generated by the processor 110, entered by a user of the device 100 via the user interface 140, received via the transceiver 150, or generated by the temperature sensing and ultrasonic scanning control unit 160. The power unit 130 may provide power to one or more components of the device 100. The transceiver 150 may send and receive one or more signals, enabling the device 100 to communicate with other devices. Signals received via the transceiver 150 may be used to determine a temperature change on a surface of the device 100.

The temperature sensing and ultrasonic scanning control unit 160 may also generate one or more signals that are used to identify a location of user touch on a surface of a display of the device 100. The temperature sensing and ultrasonic scanning of the device 100 may be determined by the processor 110, stored in the memory 120, displayed to the user via the user interface 140, and/or transmitted via the transceiver 150. In some implementations, a software application stored in the memory 120 and executed by the processor 110 uses the temperature sensing and ultrasonic scanning of the device 100 to provide features and services, such as authentication and authorization. The temperature sensing and ultrasonic scanning of the device 100 may be determined using signals received via the transceiver 150, signals generated by the temperature sensing and ultrasonic scanning control unit 160, or a combination thereof.

The utility of software applications that rely on accurate fingerprint scanning (particularly software applications with "always-on" functionality) may be optimized if temperature changes and ultrasonic measurements consume less processing resources or power resources. In one example, a temperature sensor, such as a temperature sensing diode may provide a low power and low-resolution detection option to identifying a location of a user touch event, such as when a user places a finger on a detection screen surface. The temperature change that is detected can be used as a trigger to "wake-up" a second sensor to perform a higher degree of detection, such as scanning an area to detect a user's fingerprint. By limiting an area of sensed touch, the higher precision scanning sensor, such as an ultrasonic sensor, may be used to perform high accuracy scanning of the smaller area so as not to waste energy and processing resources scanning areas which are not likely to include the user touch.

Various aspects of the disclosure are provided in the following description and related drawings directed to various examples provided for illustration purposes only. Alternate aspects may be devised without departing from the scope of the disclosure. Additionally, well-known aspects of the disclosure may not be described in detail or may be omitted so as not to obscure more relevant details.

Further, it will be appreciated that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 2A:
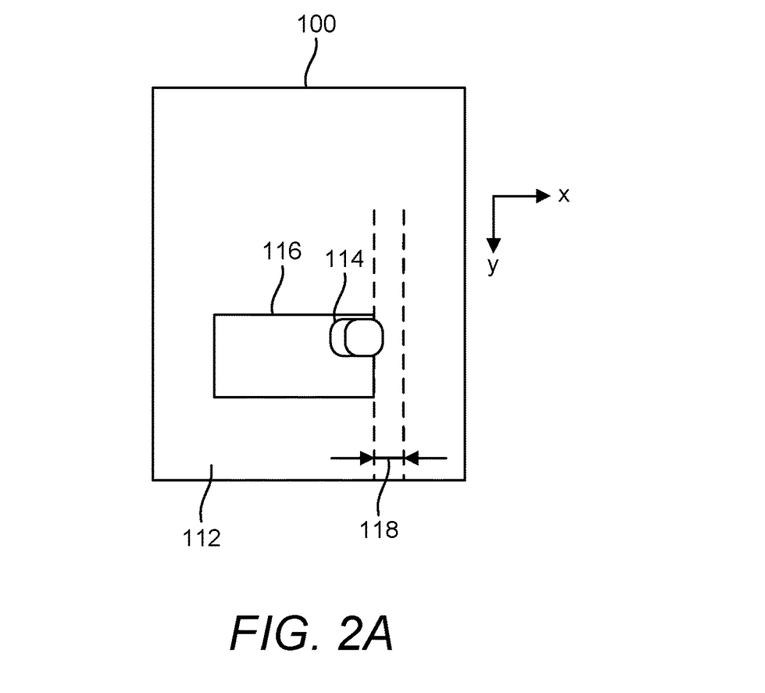
FIG. 2A illustrates a device having a conventional location sensor.

FIG. 2A illustrates a device having a conventional location sensor configuration. Referring to FIG. 2A, the conventional capacitive sensing approach can be used to identify a location of user touch via capacitive sensing on a panel side of a display interface. This approach is subject to misalignment of the sensors due to errors which occur during a lamination process. For example, the sensor configuration 100 includes a sensor area 112 which includes a plurality of capacitive sensors which may detect a finger location at an area 114 that is not the same as the actual finger location 116. The misalignment 118 between what is detected 114 via the capacitive sensors and what is actually occurring 116 can cause errors with processing and may cause excessive amounts of power to be consumed.

Figure 2B:
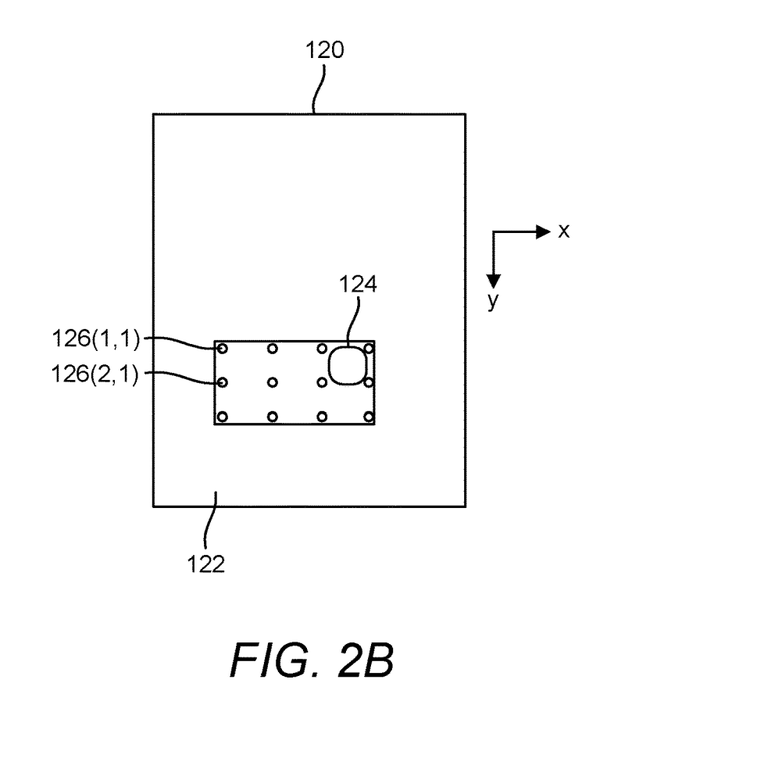
FIG. 2B illustrates a device having an temperature sensors disposed over an ultrasound sensor in accordance with aspects of the disclosure.

FIG. 2B illustrates a device having temperature sensors disposed over an ultrasound sensor in accordance with aspects of the disclosure. Referring to FIG. 2B, the sensor configuration 120 may include a plurality of sensors within a particular sensor area 122. In this configuration, the sensor has a plurality of temperature sensing diodes denoted 126(1,1), 126(2,1) to identify each diode in a group of 12 diodes which are placed approximately 10 mm apart. In other examples, the diodes 126(1,1), 126(2,1) may be concentrated in a density closer to the center of each section of the piezoelectric ultrasonic sensors, which may be spaced apart in a grid having a plurality of sensors sections measuring, e.g., approximately 20 mm×30 mm. However, in other designs, the size of a sensor section may be smaller or larger depending on the design and manufacturing specifications. Another aspect of the present application may include the plurality of temperature sensing diodes being spaced apart in a higher density near the edges of the ultrasonic sensor area. Also, another aspect of the present application may include the plurality of temperature sensing diodes being spaced equidistantly apart from one another on each temperature section of the piezoelectric ultrasonic sensor. In some designs, a larger density of diodes per unit space may provide increased accuracy with the detected temperature change resulting from the touch 124 of the user's finger, which in turn may provide a smaller area to apply the ultrasonic sensing. In some designs, less of an area required to be scanned via the ultrasonic sensing may be correlated with lower power consumption required for detecting a user's touch and/or fingerprint.

Figure 3:
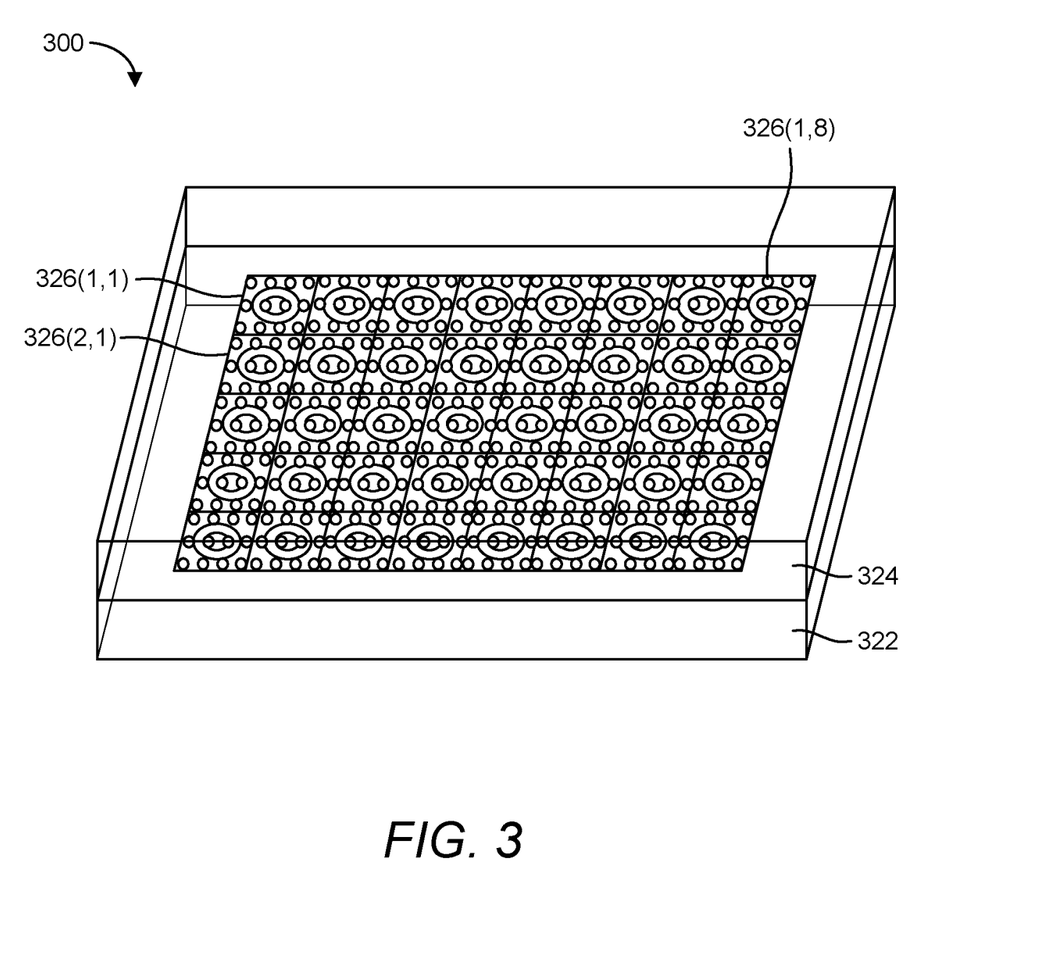
FIG. 3 illustrates a sensor stack of layers including a diode temperature sensor array disposed over a set of ultrasonic sensors in accordance with aspects of the disclosure.

FIG. 3 illustrates a sensor stack of layers including a diode temperature sensor array disposed over a set of ultrasonic sensors in accordance with aspects of the disclosure. Referring to FIG. 3, the example configuration 300 includes two layers of sensors. The first layer 322 is an ultrasonic piezoelectric layer of sensors which are arranged in a relatively uniform array of rows and columns within a defined sensor space. The second layer 324 is above the first layer 322 and includes an array of temperature sensing diodes. Each sensor section or subset of the array may include one or more ultrasonic sensors, although, for example purposes, one ultrasonic sensor is shown in each sensor section 326(x, y). Above the ultrasonic sensor of the first layer 322 is a set of temperature sensing diodes of the second layer 324. In this example, the number of diodes disposed over a single ultrasonic sensor is 12. In other designs, the number of diodes disposed over a single ultrasonic sensor may vary depending on design and manufacturing considerations. In a first sensor section row, a first sensor section may be denoted as 326(1,1), a next section adjacent to the first section 326(1,1) may be denoted as 326(2,1), and so on. In a last sensor section row, a first sensor section may be denoted as 326(1,8), and so on. The number of sensor section rows and/or sensor sections per row may vary depending on the size and requirements of the touch surface, such as a computing device display screen or a biometric sensor grid of a security interface.

Figure 4:
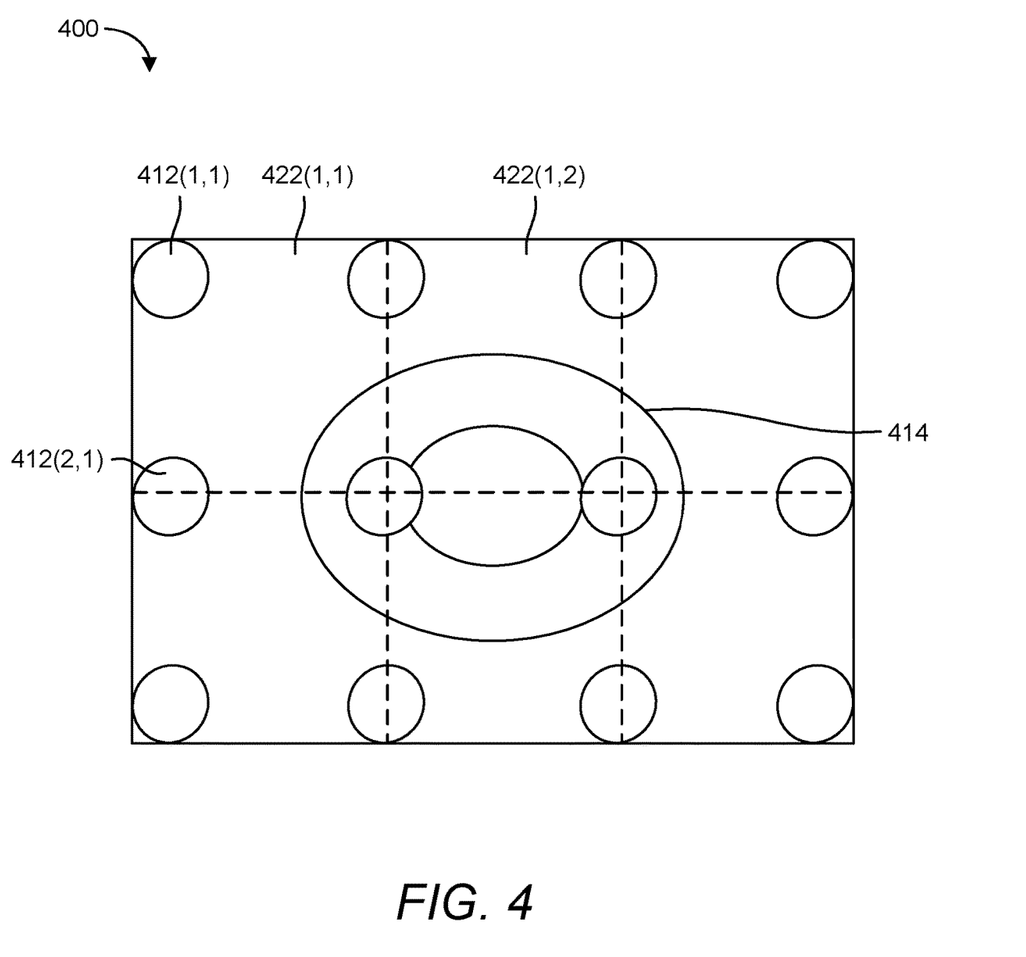
FIG. 4 illustrates a view of a single ultrasonic sensor area with a set of overlaid temperature sensing diodes disposed thereon in accordance with aspects of the disclosure.

FIG. 4 illustrates a view of a single sensor section 400 (e.g., ultrasonic sensor area) with a set of overlaid temperature sensing diodes disposed thereon in accordance with aspects of the disclosure. Referring to FIG. 4, the sensor section 400 may be one sensor section of a larger sensor array, such as the configuration 300 depicted in FIG. 3. The center of the sensor section 400 may include a single piezoelectric ultrasonic sensor 414 which may occupy a relatively large portion, such as about half or more than half of the surface area of the sensor section 400. Above the ultrasonic sensor 414 is a grid of diodes 412 with a first diode 412(1,1) and a second diode 412(2,1) adjacent to the first diode. In the sensor section 400 of FIG. 4, a total of 12 diodes may be used to define a single sensor section 414. However, more or fewer diodes may also be used in a single sensor section 414 in other designs. The diodes 412 define six subsections 422, such as subsection one 422(1,1), subsection two 422(1,2), and so on. The various subsections are independently capable of sensing a temperature change to provide a precise section of the sensor array which is experiencing a temperature change due to a user's touch being present on a display screen surface or other sensing surface. When one or more of the subsections detect a temperature change (e.g., exceeding a temperature change threshold), transmission of a control signal may be implemented to trigger a scan of the subsection(s) for fingerprint detection purposes. In some designs, each of the scanned subsections can then be combined to provide a fingerprint detection result which can be compared to known fingerprints stored in memory to provide authentication services.

In one example, the temperature diode array may provide accurate location detection of user touch. With a large density of diodes in each section of the detection area, the location of user touch may be identified with increased accuracy to provide a fingerprint detection application with an accurate fingerprint detection signal. In another example, a piezoelectric surface may be used as a first order sensor to detect user touch and wake-up an ultrasonic sensor as a second order sensor. In yet another example, the temperature sensor may be an array of temperature sensing diodes which are used as a first order sensor to wake-up an ultrasonic sensor as a second order sensor.

Figure 5:
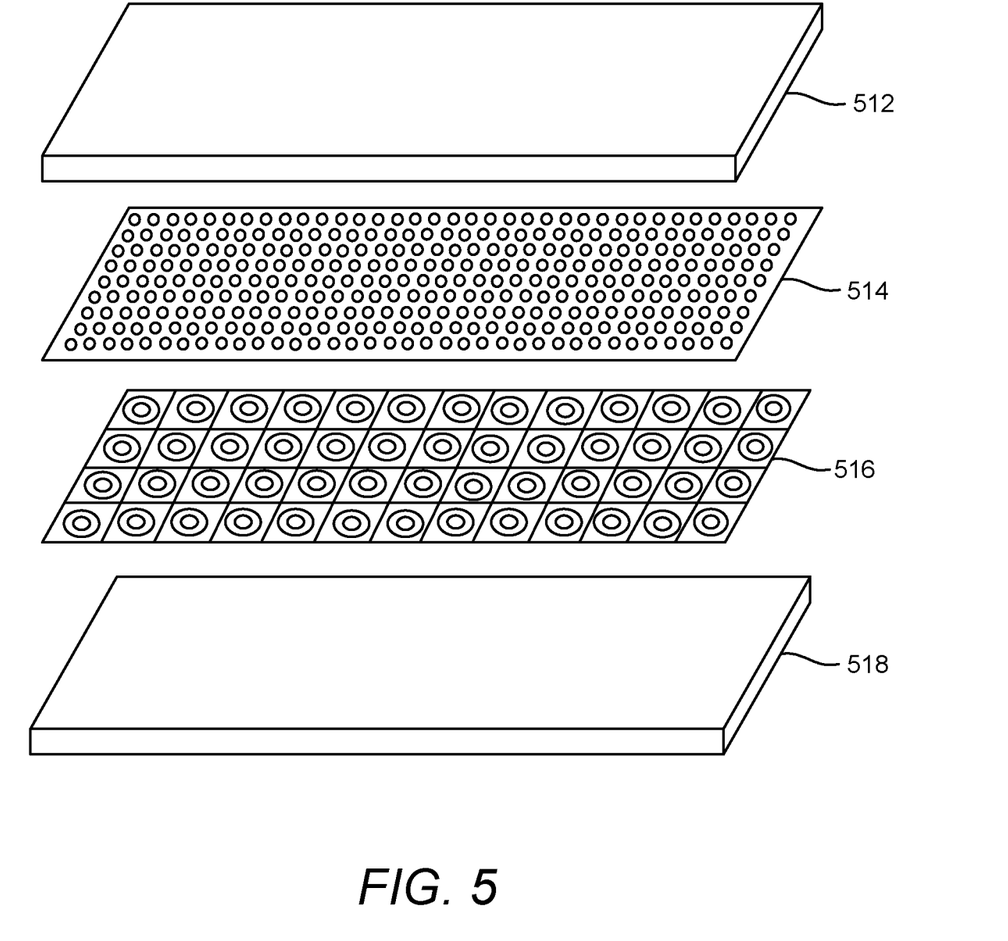
FIG. 5 illustrates an exploded view of device layers of a touchscreen fingerprint detection device in accordance with aspects of the disclosure.

FIG. 5 illustrates an exploded view of device layers of a touchscreen fingerprint detection device in accordance with aspects of the disclosure. Referring to FIG. 5, the exploded view includes four main layers, although, more or fewer layers may be present in other exemplary fingerprint detection configurations. A first layer 512 may include a single layer, such as a top surface or platen layer of glass or sealing material to protect a display. However, the first layer may also include a combination of layers including bias electrodes, a piezoelectric receiver layer, pixel electrodes, etc. A next layer 514 may include sensors, such as temperature sensing diodes which are in a high density to detect accurate locations of temperature changes that may be indicative of user touch locations. A third layer 516 may be arranged beneath the second layer 514, whereby the third layer 516 may comprise various ultrasonic sensors. A fourth layer 518 may be arranged beneath the third layer 516, whereby the fourth layer 518 may comprise one or more electrode transmitters, such as piezoelectric transmitters layer and/or additional electrodes.

The number of temperature sensing diodes may be greater than four and may include twelve in any particular sensor defined area, such as the more common 20 mm by 30 mm sensor surface space. Example embodiments demonstrate using twelve temperature sensing diodes, however any number of diodes may be used, for example, in a quantity greater than four and ideally around twelve (e.g., 8, 10, 12 or more).

In another example, the fingerprint sensor may be embedded in an organic light emitting diode (OLED) display with a touch surface as an exterior surface, and temperature sensing diodes disposed under the OLED display/touch surface, or, alternatively, the temperature sensing diodes may be disposed in a stand-alone layer outside the OLED display layers. Also, a location of the temperature sensing diodes is either closer or further than the ultrasonic sensor(s) are to the touch surface. For example, the temperature sensing diodes may be disposed in a grid that is either above or below the ultrasonic sensor layer(s).

In operation, the temperature data detected from the plurality of temperature sensing diodes can be manipulated as part of an algorithm or procedure to determine and utilize temperature characteristics. Such operations may include compounding, filtering, and/or select-fitting of the temperature sensor data to optimize finger location detection. For example, temperature gradients along an x-y plane can be mapped with increased precision based on the multiple sensor data identified along the 'x' and 'y' directions. If an external heat source is nearby the sensor surfaces, for example, an active battery inside the computing device casing (e.g., smartphone, tablet, etc.), then the generated temperature gradient due to this external source may require filtering and/or cancellation. The residual data in the heat map can be linearly or quadratically fitted to find the location of the user touch or finger location.

The temperature data detected from the plurality of temperature sensing diodes can be used to perform a background subtraction operation. For example, by subtracting the background temperature data from the foreground temperature data, a contrast of the fingerprint image data can be obtained for additional processing accuracy. When the temperature on an area of a sensor is not uniform due to local heat sources then an average background temperature is used to cancel the foreground temperature. With multiple temperature sensing diodes, the temperature can be monitored in a smaller localized region and the background compensation can be achieved with a precise temperature reading within this smaller region.

Figure 6:
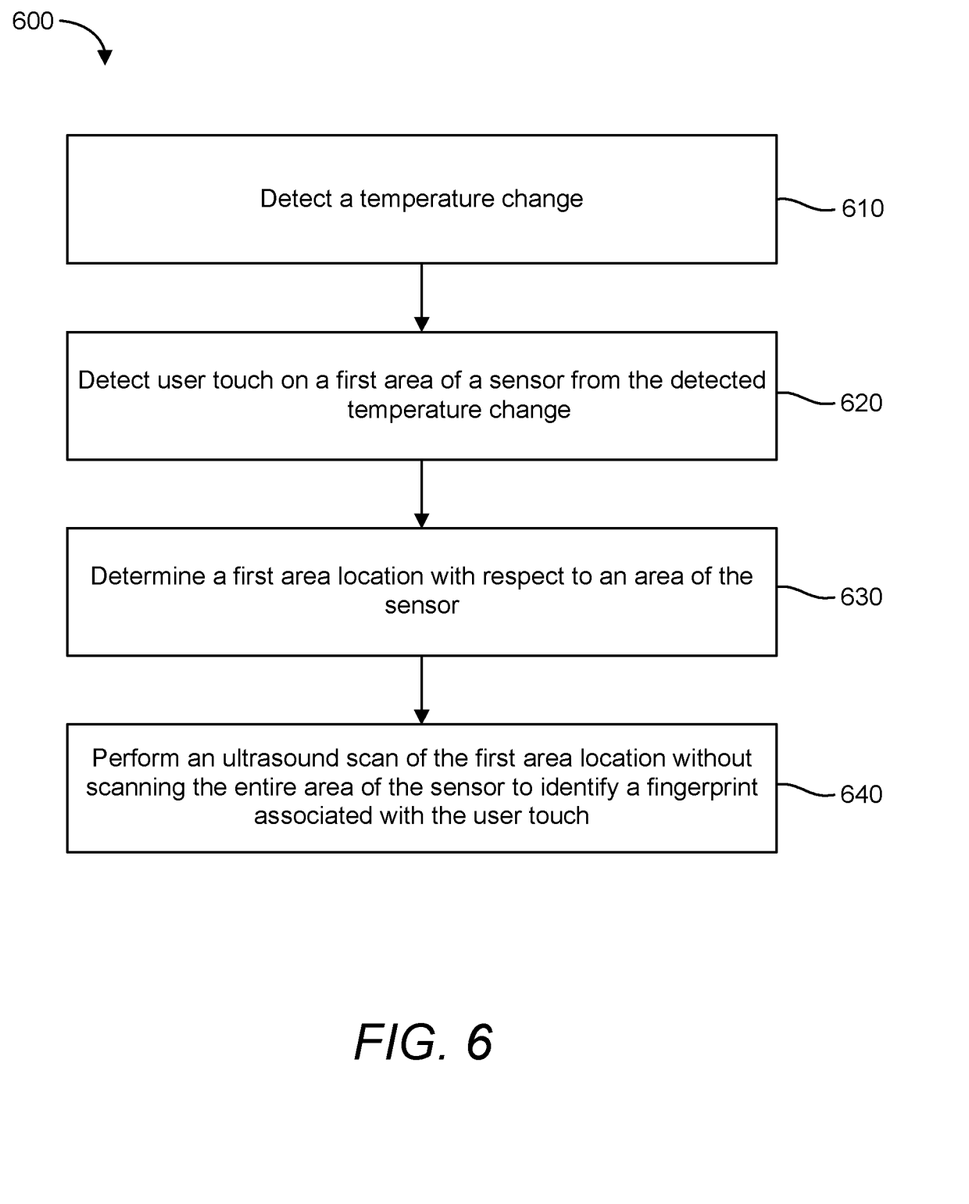
FIG. 6 illustrates an example method of operation in accordance with aspects of the disclosure.

FIG. 6 illustrates an example method of operation in accordance with aspects of the disclosure. Referring to FIG. 6, the example method 600 may include a processor configured to detect a temperature change 610, detect user touch on a first area of a sensor from the detected temperature change 620, determine a first area location with respect to an area of the sensor 630, perform an ultrasound scan of the first area location without scanning the entire area of the sensor to identify a fingerprint associated with the user touch 640. In one example, a first area of the sensor may include a plurality of temperature sensors. The plurality of temperature sensors may be temperature sensing diodes. The first area of the sensor is one of a plurality of areas each of which has a corresponding plurality of temperature sensors. The plurality of areas are part of a sensor array which overlays the sensor area. The plurality of areas in the sensor array includes six areas defined by four temperature sensors. The temperature sensing diodes are arranged in the first area approximately every 10 millimeters (mm) throughout an area of 20 millimeters (mm) by 30 mm across the area of the sensor. The number of temperature sensing diodes within the area of the sensor is 12. The temperature sensing diodes may be located at a higher density in an area adjacent a center of the sensor area. The temperature sensing diodes may instead be located at a higher density in an area adjacent edges of the sensor area. The temperature sensing diodes may also be located equidistant from one another in an area throughout the sensor area.

In another example of the present application, a device may include a fingerprint sensor that includes an ultrasonic sensor, and a plurality of temperature sensors, at least a portion of which detect a temperature change from a user touch on a first area of the ultrasonic sensor, determine a first area location with respect to an area of the ultrasonic sensor, and perform an ultrasound scan of the first area location without a scan of the entire area of the ultrasonic sensor to identify a fingerprint associated with the user touch.

Figure 7:
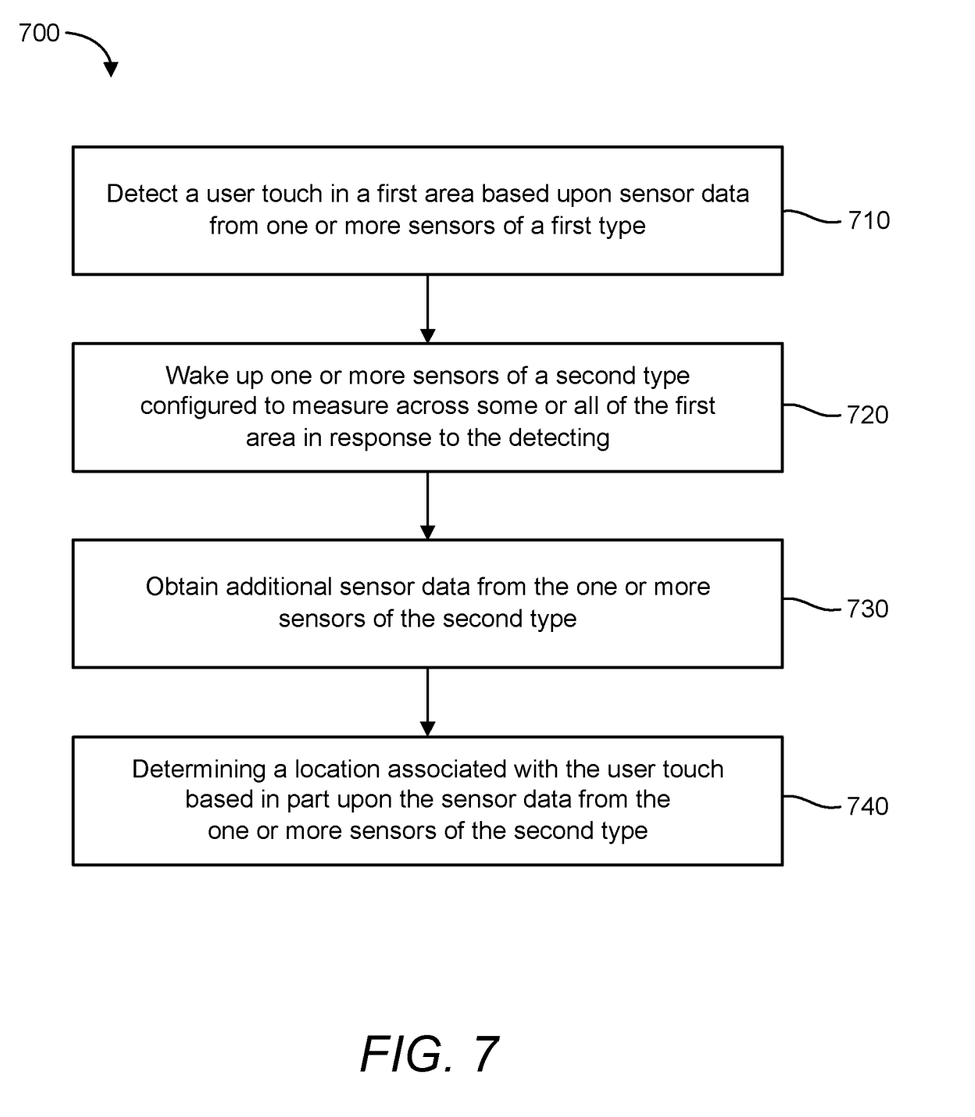
FIG. 7 illustrates an example method of operation in accordance with aspects of the disclosure.

FIG. 7 illustrates an example method of operation in accordance with aspects of the disclosure. Referring to FIG. 7, the example method 700 may include a processor configured to sense user touch. The processor may be configured to detect a user touch in a first area based upon sensor data from one or more sensors of a first type 710, wake up one or more sensors of a second type configured to measure across some or all of the first area in response to the detecting 720, obtain additional sensor data from the one or more sensors of the second type 730, and determine a location associated with the user touch based in part upon the sensor data from the one or more sensors of the second type 740.

In one example, a first type may include a temperature sensor. The temperature sensor may be a temperature sensing diode. The second type may include an ultrasonic sensor. The first type may include an ultrasonic sensor. The second type may include a temperature sensor. The first area may include a plurality of temperature sensors. The plurality of temperature sensors may be temperature sensing diodes. The first area may be one of a plurality of areas each of which includes a corresponding plurality of temperature sensors. The plurality of areas may be part of a sensor array which overlays the one or more sensors of a second type. Each of the plurality of areas in the sensor array may include six areas defined by four temperature sensors. The temperature sensing diodes may be arranged in the first area approximately every 10 millimeters (mm) throughout an area of 20 millimeters (mm) by 30 mm. The number of temperature sensing diodes within the first area may be 12. The temperature sensing diodes may be located at a higher density in an area adjacent a center of the first area. The temperature sensing diodes may be located at a higher density in an area adjacent edges of the first area. The temperature sensing diodes may be located equidistant from one another in an area throughout the sensor area.

Although certain examples depict a linear array of equally-spaced piezoelectric transducers, it will be understood that other arrangements are possible. In some implementations, capacitive micromachined ultrasonic transducers (CMUTs) may be substituted for piezoelectric transducers. However, piezoelectric transducers may be preferable under some circumstances. CMUTs typically require an elevated DC bias voltage and can suffer from unintended pull-in or snap-in effects due to electrostatic attraction between the CMUT membrane and an underlying substrate that result in highly nonlinear or ineffective operation. By contrast, piezoelectric transducers may not require a DC bias voltage. The acoustic power generated by piezoelectric transducers may greatly exceed typical CMUT devices, resulting in higher output signals (e.g. wave reception signals) with lower amplitudes of applied drive signals (e.g., piezoelectric transducer control signals). The electromechanical coupling coefficients, that is, the efficiency of converting electrical energy to mechanical energy (and back again), are generally nonlinear for CMUTs compared to piezoelectric transducers. CMUTs may suffer from the collection of charges in associated dielectric layers due to the high bias voltage. Piezoelectric transducers generally have a piezoelectric layer positioned on or near a surface of the piezoelectric transducer membrane, which can generate large amounts of bending stress and deflect the piezoelectric transducer membrane to generate and launch ultrasonic waves without concern about the height of the gap between the piezoelectric transducer membrane and the underlying substrate.

As used herein, a z-axis is arbitrarily defined as being parallel with the direction of the gravitational force. As used herein, an x-axis and ay-axis are arbitrarily defined as being within or parallel to a plane that is perpendicular to the direction of gravity. In FIGS. 2A-2B, the x-axis extends left and right and is depicted as a dotted line. The y-axis, which is perpendicular to both the x-axis and the z-axis, is not depicted.

Referring to FIG. 6, by way of example, detecting a user touch based upon data of a first type from one or more sensors of a first type and waking up one or more sensors of a second type configured to measure across some or all of the first area in response to the detecting provides one or more technical advantages, such as detecting user touch in a specific location based on the temperature change detection prior to utilizing a second type of sensor which would normally require larger amounts of power to operate. By providing a smaller and more focused area of user touch, the second sensor may only be required to scan the smaller area and thus save power. In one example the first sensor is a temperature sensing diode and the second sensor is an ultrasonic sensor. In another example, the first sensor is an ultrasonic sensor and the second sensor is the temperature sensing diode.

The methods disclosed herein may be implemented in various ways consistent with the teachings herein. In some designs, the methods are performed by functional modules. The functionality of these modules may be implemented as one or more electrical components. In some designs, the functionality of these modules may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions described herein may be implemented using any suitable means. Such means also may be implemented, at least in part, using corresponding structures as taught herein. For example, the functional modules described above may correspond to similarly designated "code for" functionality. Thus, in some aspects one or more of such means may be implemented using one or more of processor components, integrated circuits, or other suitable structures as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements."

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of non-transitory storage medium known in the art. As used herein the term "non-transitory" does not exclude any physical storage medium or memory and particularly does not exclude dynamic memory (e.g., RAM) but rather excludes only the interpretation that the medium can be construed as a transitory propagating signal. An example storage medium is coupled to the processor such that the processor can read information from, and write information to, the storage medium. In the alternative, the storage medium may be integral to the processor (e.g., cache memory).

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of sensing user touch, comprising:
   detecting a user touch in a first area based upon sensor data from one or more sensors of a first type, wherein the first area comprises between 6 and 12 temperature sensing diodes;
   waking up one or more sensors of a second type configured to measure across some or all of the first area in response to the detecting;
   obtaining additional sensor data from the one or more sensors of the second type; and
   determining a location associated with the user touch based in part upon the sensor data from the one or more sensors of the second type.

2. The method of claim 1, wherein the second type comprises an ultrasonic sensor.

3. The method of claim 1, wherein the first area is one of a plurality of areas each of which comprises a corresponding plurality of temperature sensors.

4. The method of claim 3, wherein the plurality of areas are part of a sensor array which overlays the one or more sensors of a second type.

5. The method of claim 1, wherein the temperature sensing diodes are arranged in the first area approximately every 10 millimeters (mm) throughout an area of 20 millimeters (mm) by 30 mm.

6. The method of claim 1, wherein the temperature sensing diodes are located at a higher density in an area adjacent a center of the first area.

7. The method of claim 1, wherein the temperature sensing diodes are located at a higher density in an area adjacent edges of the first area.

8. The method of claim 1, wherein the temperature sensing diodes are located equidistant from one another in an area throughout the sensor area.

9. A device comprising:
   a fingerprint sensor including:
      an ultrasonic sensor; and
      a plurality of temperature sensing diodes located at a higher density in an area adjacent a center of the ultrasonic sensor area, at least a portion of which
      detect a temperature change from a user touch on a first area of the ultrasonic sensor;
      determine a first area location with respect to an area of the ultrasonic sensor; and
      perform an ultrasound scan of the first area location without a scan of the entire area of the ultrasonic sensor to identify a fingerprint associated with the user touch.

10. The device of claim 9, wherein the first area of the ultrasonic sensor is one of a plurality of areas each of which comprises a corresponding plurality of temperature sensors.

11. The device of claim 10, wherein the plurality of areas are part of a sensor array which overlays the ultrasonic sensor area.

12. The device of claim 11, wherein the plurality of areas in the sensor array includes six areas defined by four temperature sensors.

13. The device of claim 9, wherein the temperature sensing diodes are arranged in the first area approximately every 10 millimeters (mm) throughout an area of 20 millimeters (mm) by 30 mm across the area of the ultrasonic sensor.

14. The device of claim 9, wherein the number of temperature sensing diodes within the ultrasonic sensor area is between 6 and 12.

15. The device of claim 9, wherein the fingerprint sensor further comprises an organic light emitting diode (OLED) display with a touch surface as an exterior surface.

16. The device of claim 15, wherein the temperature sensing diodes are disposed under the OLED display or in a stand-alone layer outside the OLED display, and wherein a location of the temperature sensing diodes is either closer or further than the ultrasonic sensor to the touch surface.

17. The device of claim 9, wherein temperature data detected from the plurality of temperature sensing diodes is compounded, filtered, and/or select-fitted to optimize finger location detection.

18. The device of claim 9, wherein the temperature data detected from the plurality of temperature diodes is used to perform a background subtraction operation.

* * * * *